Figure 1:
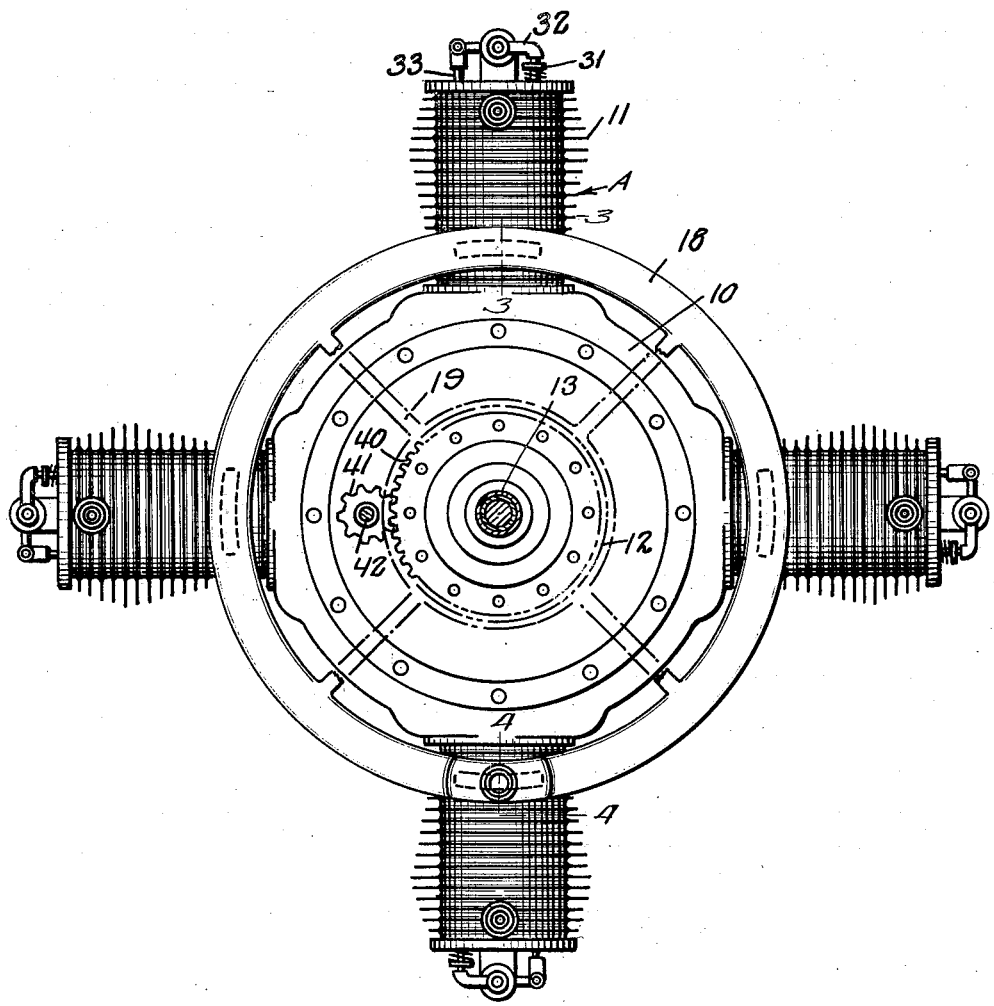

Jan. 6, 1931.  A. C. DE LANGE  1,787,673
TWO-CYCLE RADIAL ENGINE
Filed Nov. 16, 1926   5 Sheets-Sheet 1

Ambrose C. De Lang,
Inventor

Witness

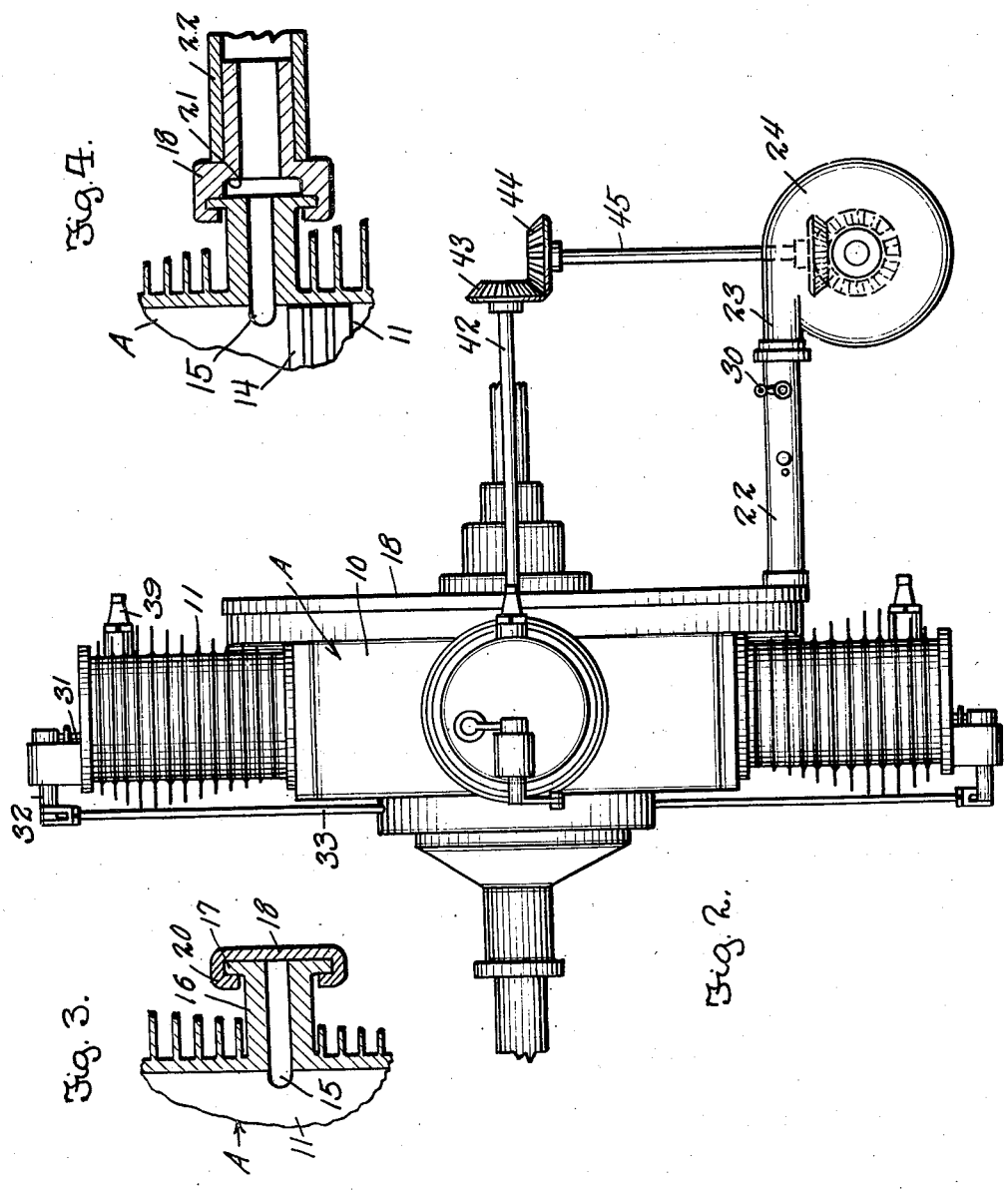

Jan. 6, 1931.  A. C. DE LANGE  1,787,673
TWO-CYCLE RADIAL ENGINE
Filed Nov. 16, 1926   5 Sheets-Sheet 3

Ambrose C. De Lange, Inventor

Witness

By Richard B. Owen

Attorney

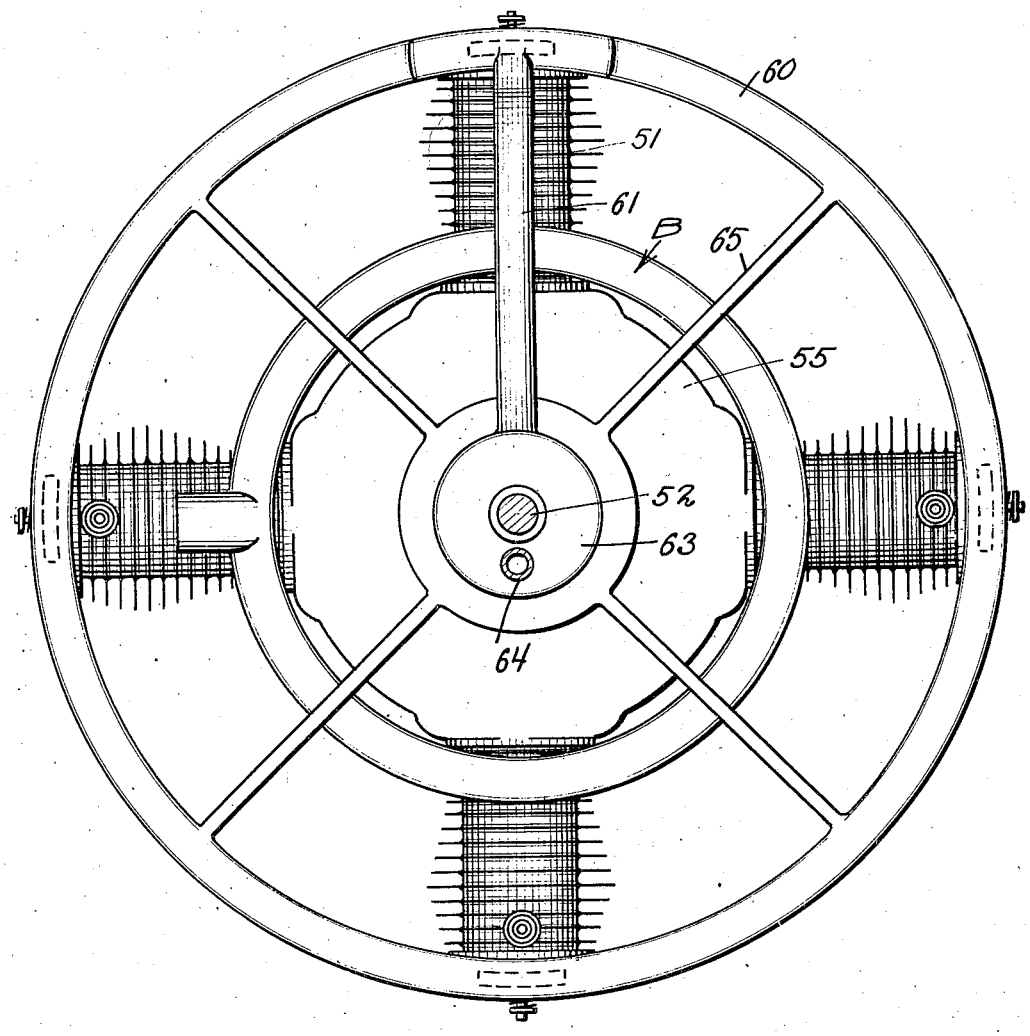

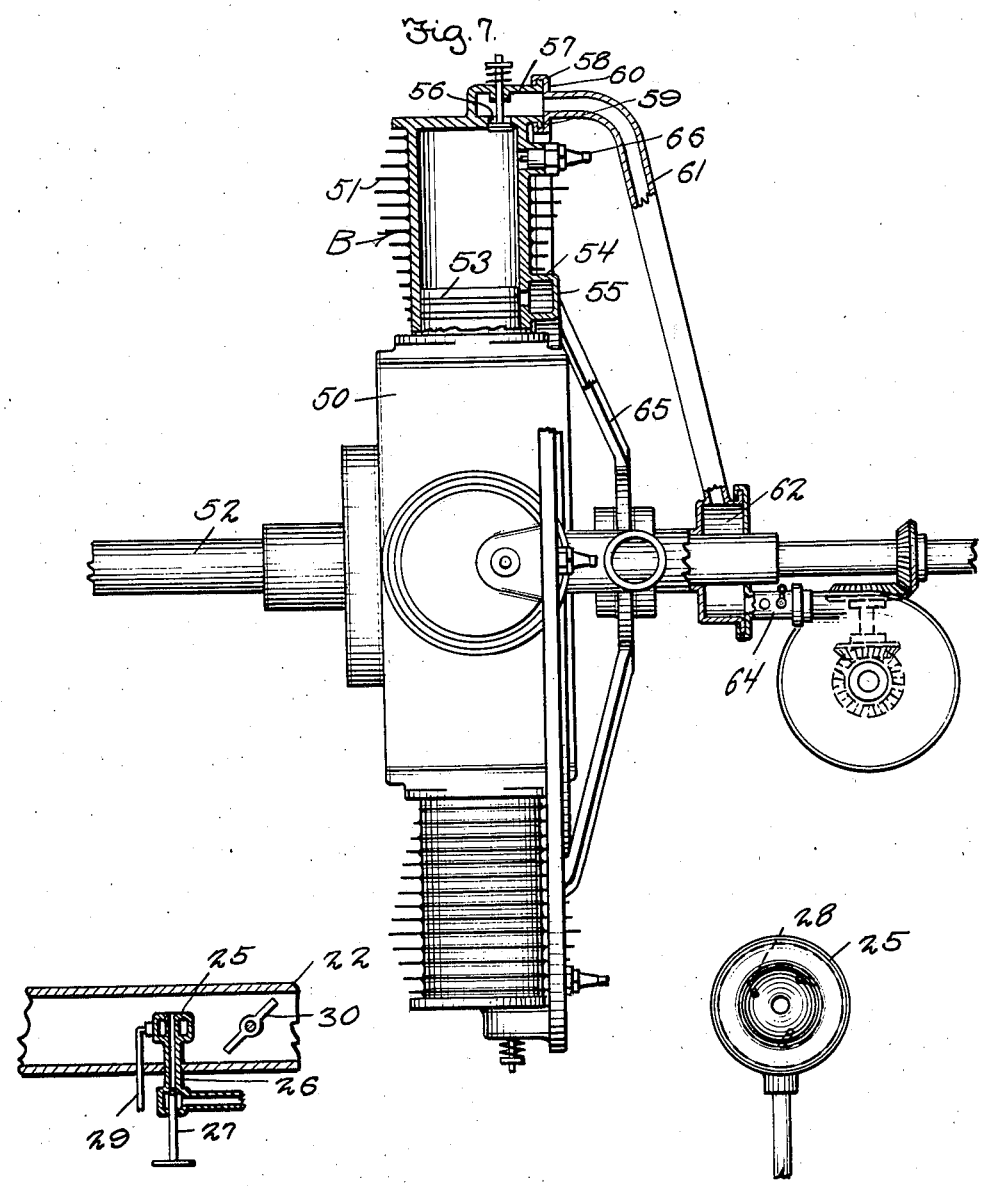

Patented Jan. 6, 1931

1,787,673

UNITED STATES PATENT OFFICE

AMBROSE C. DE LANGE, OF KALISPELL, MONTANA, ASSIGNOR TO DE LANGE IMPROVED TWO-CYCLE MOTOR COMPANY, OF KALISPELL, MONTANA, A CORPORATION OF MONTANA

TWO-CYCLE RADIAL ENGINE

Application filed November 16, 1926. Serial No. 148,750.

This invention appertains to multiple cylinder engines of the two cycle type and more particularly to that type of such engines, which are adaptable to be used in connection with air craft.

One of the primary objects of the present invention is to provide a powerful two cycle engine embodying radially disposed cylinders having novel means for supplying the charge to the cylinders and novel means for exhausting the cylinders.

Another salient object of the invention is the provision of a radial cylinder rotary two cycle engine in which the kinetic energy of the burned gases exhausting out of the exhaust valves plus the centrifugal force of the cylinder action together with the incoming pressure of the new charge act to quickly scavenge the cylinders and to quickly reload the cylinders.

A further object of the invention is the provision of a multiple cylinder rotary engine of the two cycle type having inlet ports formed therein adjacent to the inner end of the piston stroke and adapted to be uncovered by the piston at the end of its work stroke, the ports being received in a stationary annular inlet ring for travelling movement therearound, the inlet ring having a port in one portion thereof communicating with its charge supplying device, the said inlet port of the ring being adapted to supply the cylinders with a fresh charge as the cylinders pass the same, the inlet ports of the cylinders being opened by the pistons at the time the cylinders pass said inlet ring port.

A further object of the invention is the provision of novel means for operating the exhaust valves of the cylinders at a fraction of time prior to the opening of the inlet port, whereby the kinetic energy of the outrushing gases will tend to create a vacuum to facilitate the pulling in of the fresh charge.

A further object of the invention is the provision of novel means for operating the exhaust valves by the use of a stationary cam, which is adap ed to be engaged by the push rods of said exhaust valves, the cam being manually adjustable within a certain limit to control the exhausting of the cylinders according to light or heavy charges.

A further object of the invention is the provision of novel means for supplying the fuel charge in an atomized condition under pressure to the inlet port of the inlet ring, said means comprising a power driven air fan having its outlet connected with the inlet port of the ring with the fuel cross ported in the outlet of the fan, the fuel being sprayed in the outlet by the use of compressed air nozzles which function to atomize the charge to a fine vapor.

A further object of the invention is the provision of a throttle valve arranged between the air fan and the fuel spraying device so as to increase the pressure in the fan outlet.

A further object of the invention is to provide means for delivering the fuel charge to the cylinders of a radial stationary two cycle engine, said means embodying the use of a rotatable inlet ring having an inlet port adapted to communicate with the inlet ports of the cylinders at predetermined intervals.

A further object of the invention is the provision of automatic valves for controlling the inlet charge into the cylinders of the stationary radial engine, the exhaust ports of the engine being controlled by the pistons and so arranged that the kinetic energy of the exhausting burnt gases will operate the inlet valves.

Figure 5:
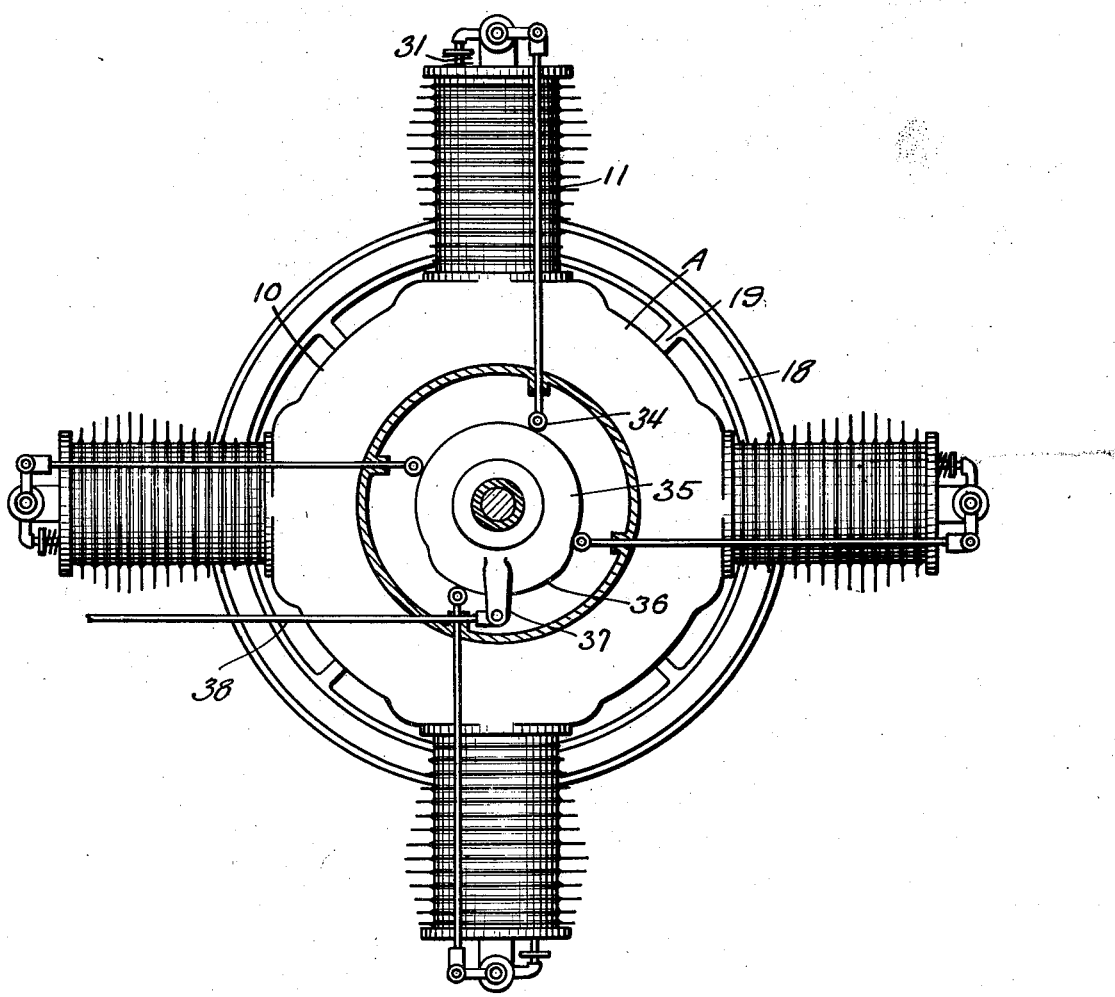

With these and other objects in view the invention consists in the novel construction, arrangement and formation of parts as will be hereinafter more specifically described, claimed, and illustrated in the accompanying drawings, in which drawings:

Figure 1 is a front elevation of a rotary engine constructed in accordance with this invention, Figure 2 is a side elevation of the same, Figure 3 is a detail section taken on the line 3—3 of Figure 1 illustrating the formation of the inlet port in one of the cylinders, Figure 4 is a detail section taken on the line 4—4 of Figure 1 illustrating the inlet port in the cylinder and the inlet port in the inlet ring, Figure 5 is an elevation of the engine looking from the opposite direction from Figure 1, Figure 6 is a front elevation showing my invention applied to a radial engine of the stationary cylinder type, Figure 7 is a side elevation of the same showing parts thereof broken away and in section, Figure 8 is a fragmentary longitudinal section through the outlet of the air fan showing the fuel atomizing device cross ported therein, and Figure 9 is a view of the atomizing device showing the outlet thereof.

Referring to the drawings in detail wherein similar reference characters designate corresponding parts throughout the several views the letter A generally indicates a radial rotary engine of the two cycle type which comprises an annular crank case 10 having connected therewith a plurality of radially extending air cooled cylinders 11. While in the present instance only four cylinders have been shown it is to be understood that any number of cylinders can be utilized. The crank case can have bolted thereto in the usual way a drive ring 12 to which is adapted to be connected the drive shaft for the propeller. The crank shaft 13 extends axially into the crank case and is held against movement relative thereto. The pistons 14 for the cylinders are connected with the crank shaft 13 in any preferred way.

In accordance with this invention the cylinders 11 adjacent to their inner ends are each provided with an arcuate elongated inlet port 15. This port is adapted to be uncovered by the piston at the end of its working stroke. Each cylinder around its inlet port is provided with a sleeve 16 the outer end of which is provided with guide flanges 17.

In order to supply the cylinders with the fuel charge, I provide an annular inlet ring 18 which is connected by suitable spokes or the like 19 with the crank shaft 13 or other stationary part. The inner and outer circumferential edges of the inlet ring 18 is provided with guide flanges 20 which receive the flanges 17 of the inlet sleeves and these sleeves are adapted to travel around said inlet ring during rotation of the cylinders.

At one portion of the ring 18, preferably at the lower end thereof, an elongated inlet port 21 is provided. This port has communicating therewith an inlet pipe 22 leading from the outlet 23 of an air pump or fan 24.

One of the important features of the invention is the supplying of the fuel charge to the inlet port 21 and I preferably cross port the fuel in the pipe 22 in the path of the inrushing air from the fan in an atomized condition. In accordance with this, a nozzle 25 is arranged in the pipe 22 and is connected with a gasoline feed pipe 26. The flow of gasoline or other fuel is controlled by a suitable needle valve 27. The nozzle 25 has arranged around the same a plurality of compressed air jets 28 which have communication with a compressed air feed pipe 29 leading from a suitable source of compressed air. The outlets 28 for the air are preferably arranged spirally relative to the nozzle so as to insure the effective breaking up of the fuel and to spray the fuel in the pipe in a whirling motion.

In order to increase the pressure within the pipe 22 I provide a throttle valve 30, which is arranged between the nozzle 25 and the outlet 23 of the fan 24. By this arrangement the introduction of the fuel charge under pressure in an atomized condition in the cylinders is insured.

The outer ends of the cylinders are provided with exhaust valves 31, which are adapted to be actuated by rocker arms 32. These rocker arms are in turn actuated by push rods 33, which extend inwardly toward the crank shaft of the engine. Suitable anti-friction rollers 34 can be mounted on the inner ends of these push rods and normally engage a stationary cam 35 connected with the crank shaft. The throw portion 36 of the cam starts slightly in advance of the inlet port of the inlet ring 18 so that the exhaust valve of the cylinder will be open momentarily before the admission of the new charge. I prefer to have the cam 35 adjustable so that the throw portion 36 can be moved relative to the inlet port of the ring and thus allow the exhausting of the cylinders to be accurately controlled according to heavy or light charges. In accordance with this an arm 37 is carried by the cam 35 and an operating rod 38 is connected with the said arm.

Suitable spark plugs 39 are carried by the cylinders and the ignition of these plugs is controlled in any desired or conventional way.

In operation of the improved two cycle engine, as the cylinders rotate and pass the inlet port 21 of the ring 18 the port 15 in the cylinder will be uncovered by the piston allowing the quick loading thereof. As the cylinder continues its rotation the piston moves to the top of the cylinder and compresses the charge which is now fired. The piston moves inwardly on its power stroke and when the same reaches approximately the end of this stroke, the exhaust valve thereof is opened by the cam, which allows the exhausting of the charge. The cylinder now moves to its charge intaking position and the kinetic energy of the outrushing burnt gases will function to pull in the new charge and the new charge also aids in the scavenging of the cylinder. The centrifugal action of the rotary engine also functions to help this scavenging process. This action takes place in all the cylinders in proper sequence as can be readily understood. A spur gear 40 can be formed on the drive disk and has meshing therewith a spur gear 41 keyed to a drive shaft 42. This shaft 42 terminates above the fan 24 and has secured to its outer end a beveled gear 43 which meshes with a beveled gear 44 on a vertical shaft 45 which is utilized for operating the fan 24.

In Figures 6 and 7 I have illustrated my invention applied to a radial engine of the stationary cylinder type and this engine is generally indicated by the reference character B. The engine B comprises the annular crank case 50 having a plurality of radial cylinders 51 secured thereto and the crank case supports the rotatable crank shaft 52. The pistons 53, which are reciprocably mounted in the cylinders are connected in the conventional manner with the crank shaft 52.

The invention contemplates the provision of outlet ports 54 formed in the cylinders adjacent to the inner ends thereof and these ports are adapted to be uncovered for exhausting purposes by the pistons 53 at the proper intervals. All of the ports 54 communicate with an annular exhaust manifold 55 which can be formed on or connected with the cylinders in any desired way.

The outer ends of the cylinders are provided with inlet ports 56 which are normally closed by automatically operated spring pressed poppet valves 57. The ports 56 are covered by short inlet pipes 58, which are of an elongated arcuate form so as to conform to the axis of the crank case. The outer ends of each of the inlet pipes 58 terminate in lateral guide flanges 59 for receiving an annular rotatable inlet ring 60. This ring has communicating therewith at one portion thereof, preferably at its upper end the inlet charge pipe 61 which extends to an annular housing 62 carried by and rotatable with the crank shaft 52. The housing 62 is provided with a stationary cover plate 63 and entering into the housing through the cover plate is the charge supplying device 64 which is the same as the charge supplying device for my rotary engine previously described. It is to be noted however that the fan is driven from the crank shaft of the engine. The rotatable ring 60 is carried by the crank shaft and suitable spokes 65 are utilized for connecting the ring with the crank shaft. The spokes 65 are placed at predetermined points best suited to the engine.

Conventional spark plugs 66 are provided for the cylinders and are fired by any desired type of ignition mechanism.

In this form of the engine the cylinders are stationary, as heretobefore stated and as the ring 60 rotates past the inlet pipes the new charge is taken in the cylinders. At the end of the power stroke the piston uncovers the exhaust port 54 and the outrushing of the exhaust gases combined with the pressure of the incoming charge automatically unseats the valve 56 and allows the quick reloading of the cylinder and the scavenging thereof. The valve functions to automatically regulate the amount of the charge for the engine.

Changes in details may be made without departing from the spirit or scope of this invention, but what I claim as new is:

1. In a two cycle engine, a crank case, a plurality of cylinders radiating from the crank case having inlet ports, pistons controlling the inlet ports, an annular ring having connection with the ports, the cylinders and the ring being rotatable relative to one another, and an inlet port communicating with the ring at one point.

2. In a two cycle engine, a crank case, a plurality of cylinders radiating from the crank case having inlet and outlet ports, pistons controlling the inlet ports, the inlet ports being provided with lateral inlet pipes terminating in guide flanges, an annular ring forming a raceway receiving said guide flanges of the inlet ports, the ring having a single inlet port at a predetermined point, and means for supplying a continuous charge to said last mentioned inlet port.

3. In a two cycle combustion engine, a crank case, a plurality of cylinders radiating from the crank case having inlet and exhaust ports, laterally extending short inlet pipes for the inlet ports having guide flanges thereon, an annular inlet ring arranged at one side of the cylinders forming a raceway receiving said guide flanges, the cylinders and the ring being rotatable relative to each other, the ring having an inlet port at one point, means for supplying a fuel charge continuously to the inlet port of the ring, the inlet pipes of the cylinders being adapted to aline with the inlet port of the ring successively, and means for opening the exhaust port momentarily in advance of the alining of the inlet pipes with the inlet port of the ring, as and for the purpose specified.

4. In a rotary two cycle engine, a crank case, a plurality of cylinders radiating from the crank case, each cylinder having an arcuate inlet port adapted to be controlled by the travel of the piston in the cylinder, laterally extending inlet extensions having guide flanges surrounding said inlet ports, an annular stationary inlet ring receiving said inlet extensions and guide flanges, the inlet ring having a single inlet port at one point, means for supplying a continuous fuel mixture under pressure to said port, the inlet extensions of the cylinders being adapted to successively aline with the inlet port of the ring, the cylinders having exhaust valves, and means for operating said valves at predetermined times relative to the alining of the inlet extensions with the inlet port of the ring.

5. In a rotary two cycle engine, a crank case, a plurality of cylinders radiating from the crank case, the cylinders having inlet and exhaust ports disposed in spaced relation, one of which is adapted to be controlled by the piston travel, an annular inlet ring forming a trackway, the inlet ports having short flanged extensions disposed in said inlet ring, a single inlet port for said ring, means for supplying a fuel mixture continuously to said port of the ring, and means for connecting the ring to a stationary portion of the engine.

6. In a rotary two cycle engine, a crank case, a plurality of cylinders radiating from the crank case, the cylinders having elongated arcuate inlet ports adjacent to the inner ends thereof, laterally extending short inlet extensions surrounding said ports, an annular inlet ring arranged at one side of the engine receiving said inlet extensions, means securing the ring to a stationary portion of the engine, the ring having a single inlet port, the inlet extensions of the cylinders being adapted to successively aline with the inlet port of the ring during rotation of the cylinders, means for supplying a fuel vapor under pressure continuously to the inlet port of the ring, exhaust valves carried by the outer ends of the cylinders, and means for positively operating said valves in timed relation relative to the alining of the inlet extensions with the inlet port of the ring.

7. In a rotary two cycle engine, a crank case, a plurality of cylinders radiating from the crank case, a stationary crank shaft, a stationary inlet ring disposed on one side of the engine forming a guide track, the inner ends of the cylinders having arcuate inlet ports provided with lateral extensions slidably mounted in the inlet ring, a single inlet port for the ring, means for supplying a vaporized fuel mixture under pressure continuously to said inlet port, the exhaust valves carried by the outer ends of the cylinders, push rods for operating said valves, and a throw cam on the crank shaft for actuating said exhaust valve push rods in timed relation to the alining of the inlet extensions with the inlet port of the ring.

8. In a rotary two cycle engine, a crank case, a plurality of cylinders radiating from the crank case, a stationary crank shaft, a stationary inlet ring disposed on one side of the engine forming a guide track, the inner ends of the cylinders having arcuate inlet ports provided with lateral extensions slidably mounted in the inlet ring, a single inlet port for the ring, means for supplying a vaporized fuel mixture under pressure continuously to said inlet port, the exhaust valves carried by the outer ends of the cylinders, push rods for operating said valves, and a throw cam on the crank shaft for actuating said exhaust valve push rods in timed relation to the alining of the inlet extensions with the inlet port of the ring, and means for adjusting the cam for varying the throw portion thereof relative to the inlet port of the ring.

9. In a rotary two cycle engine, a crank case, a plurality of cylinders radiating from the crank case, the cylinders having elongated arcuate inlet ports adjacent to the inner ends thereof, lateral short extensions covering said ports terminating in guide flanges, a stationary inlet ring arranged on one side of the engine having guide flanges for receiving the guide flanges on said extensions, the ring being provided with a single inlet port, and means for supplying a vaporized fuel mixture under pressure to said inlet port of the ring.

10. In a two cycle combustion engine, a crank case, a plurality of cylinders radiating from the crank case having inlet ports provided with lateral extensions, an annular inlet ring receiving said extensions having a single inlet port, and means for supplying a vaporized fuel mixture under pressure continuously to the inlet port of the ring including a positively driven air fan having an inlet leading toward the inlet port of the ring, and a vaporized fuel mixture cross ported in said inlet.

11. In a two cycle combustion engine, a crank case, a plurality of cylinders radiating from the crank case having inlet ports provided with lateral extensions, an annular inlet ring receiving said extensions having a single inlet port, and means for supplying a vaporized fuel mixture under pressure continuously to the inlet port of the ring including a positively driven air fan having a delivery pipe communicating with the inlet port of the ring, a fuel nozzle having an outlet for the fuel and a plurality of compressed air outlets surrounding the fuel outlet, the nozzle extending radially into the delivery pipe, and a butterfly valve in the delivery pipe between the fan and the nozzle.

12. In a rotary two cycle engine, a crank case, a plurality of cylinders radiating from the crank case, each cylinder having an arcuate inlet port adapted to be controlled by the travel of the piston in the cylinder, laterally extending inlet extensions having guide flanges surrounding said inlet ports, an annular stationary inlet ring receiving said inlet extensions and guide flanges, the inlet ring having a single inlet port at one point, and means for supplying a continuous fuel mixture under pressure to said port, the inlet extensions of the cylinders being adapted to successively aline with the inlet port of the ring.

In testimony whereof I affix my signature.

AMBROSE C. DE LANGE.